United States Patent [19]
Cramer et al.

[11] Patent Number: 6,107,957
[45] Date of Patent: *Aug. 22, 2000

[54] RADAR LEVEL GAUGE

[75] Inventors: Stefan Cramer, Lampertheim; Rolf Gluth, Blaustein; Thomas Schake, Senden, all of Germany; Brian E. Richter, Bloomington, Minn.

[73] Assignees: Rosemount Inc., Eden Prairie, Minn.; DaimlerChrysler Aerospace AG, Ulm, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/105,673

[22] Filed: Jun. 26, 1998

[30]    Foreign Application Priority Data

Jun. 27, 1997 [EP]  European Pat. Off. .............. 97110575

[51] Int. Cl.$^7$ .................................................. G01S 13/26

[52] U.S. Cl. ......................................... 342/124; 342/196

[58] Field of Search ...................................... 342/124, 196

[56]            References Cited

U.S. PATENT DOCUMENTS

| | | | |
|---|---|---|---|
| 4,044,355 | 8/1977 | Edvardsson | 342/124 |
| 4,443,792 | 4/1984 | Pidgeon et al. | 342/124 |
| 4,621,264 | 11/1986 | Yashiro et al. | 342/124 |
| 4,641,139 | 2/1987 | Edvardsson | 342/124 |
| 4,665,403 | 5/1987 | Edvardsson | 342/124 |
| 4,737,791 | 4/1988 | Jean et al. | 342/124 |
| 4,945,360 | 7/1990 | Trummer et al. | 342/122 |
| 5,070,730 | 12/1991 | Edvardsson | 73/290 |
| 5,136,299 | 8/1992 | Edvardsson | 342/124 |
| 5,305,237 | 4/1994 | Dalrymple et al. | 364/562 |
| 5,321,408 | 6/1994 | Jean et al. | 342/124 |
| 5,323,361 | 6/1994 | Elle et al. | 367/98 |
| 5,365,178 | 11/1994 | Van Der Pol | 324/644 |
| 5,387,918 | 2/1995 | Wiesbeck et al. | 342/128 |
| 5,406,842 | 4/1995 | Locke | 73/290 |
| 5,438,867 | 8/1995 | Van Der Pol | 73/290 V |
| 5,495,218 | 2/1996 | Erb et al. | 333/248 |
| 5,499,189 | 3/1996 | Seitz | 364/480 |
| 5,504,490 | 4/1996 | Brendle et al. | 342/118 |
| 5,546,088 | 8/1996 | Trummer et al. | 342/124 |
| 5,609,059 | 3/1997 | McEwan | 73/290 R |
| 5,614,911 | 3/1997 | Otto et al. | 342/124 |
| 5,659,321 | 8/1997 | Burger et al. | 342/124 |

FOREIGN PATENT DOCUMENTS

| | | |
|---|---|---|
| 0 234 479 A2 | 9/1987 | European Pat. Off. . |
| 0 647 587 A1 | 4/1995 | European Pat. Off. . |
| 4327333 | 8/1993 | Germany ........................ G01F 23/28 |
| 43 27 333 A1 | 2/1995 | Germany . |
| 44 05 855 A1 | 8/1995 | Germany . |

OTHER PUBLICATIONS

Chengge, Z. et al, "A method for target estimation of level radar", CIE Int'l Conf. of Radar 1996, pps. 270–273.

Brumbi, D., "Measuring process and storage tank level with radar technology", Int'l Radar Conf 1995, Record of the IEEE, pps. 256–260.

Weiss, M. et al, "Novel methods of measuring impurity levels in liquid tanks", Microwave Symposium Digest, 1997, IEEE MTT-S Int'l, vol. 3, pps. 1651–1654.

(List continued on next page.)

*Primary Examiner*—John B. Sotomayor
*Attorney, Agent, or Firm*—Westman, Champlin & Kelly, P.A.

[57]                ABSTRACT

A FMCW radar tank level gauge (14) that measures a level (13) in a tank (10) by obtaining a set of phase shift data points of mixed transmitted waves and received waves. The set of spectral data phase shift values has a received target marker indicating the level. An adaptive set of masking threshold phase shift values corresponding to at least a portion of the spectral data phase shift values are calculated. The adaptive set of masking threshold values are compared with the corresponding spectral data values to identify at least one spectral data value associated with the level. The level of the tank is calculated from at least one spectral data value and the level of the tank is reported.

6 Claims, 9 Drawing Sheets

OTHER PUBLICATIONS

"Auswertemethoden zur Präzisionsentfernungsmessung mit FMCW–Systemen und deren Anwendung im Mikrowellenbereich", by Reinhard Stolle et al. for *Technisches Messen 62* 1995 2, pp. 66–73.

"Mikrowellen messen Füllstände" by Prof. Dr. Johanngeorg Otto for *Design & Elektronik–Sensortechnik* vol. 10, (1997) pp. 40–44.

"Continuous Level Measurement Using Phase Tracking" by Tom Cournane et al. for *Measurements & Controls,* Jun. 1993, pp. 110–112.

"A new method to achieve highest custody transfer accuracy with radar based levelgauging" by B.L. Hägg et al. for *Instrument Society of America* (1995), pp. 687–693.

*Radar Handbook,* section 3.13, pp. 3.46–3.53, by Merrill I. Skolnik, 1990.

"Digitale Methoden Zut Frequenzbestimmung Bei Mono–Und Multifrequenten Signalen" by Prof. Dr. J. Otto for *Tagesband Mess Comp* 5–7, Sep. 1995, pp. 113–117.

"Frequency Analysis", by R.B. Randall, *Brüel & Kjaer*, pp. 48–55, (Sep. 1987).

"Level Gauging by Radar", by H. Westerlind, *ISA*, pp. 1385–1396, (1989).

"Some Aspects of the Zoom Transform", by P.c. Yip, *IEEE Transactions on Computers*, vol. c–25, No. 3, pp. 287–296, (Mar. 1976).

"Measuring Level With Radar Technology", by F.M. Fitch, *Sensors*, pp. 40–41, (Apr. 1993).

"A Description of a New Radar Tank Gauge and the Methods Used to Facilitate Installation", by H.G. Westerlind, *ISA, Paper #92–0391*, 8 pgs., (1992).

"Microwave Radar Targets Tough Application", by D. Robertson, *Intech*, pp. 39–40, (Mar. 1992).

"Advanced Burden Level Measurement Radars Using FFT Signal Processing Techniques", *I&SM*, pp. 12–13, (Aug. 1993).

"Safety of Tank Gauges Sparks off Debate", by M. Ryle, *The Motor Ship*, 1 page, (Mar. 1994).

"Radar Systems Getting a Practical Approach", by K. Blundy, *Level Systems*, (1 page, (undated) (publication unknown).

"Radar Level Gauge is Long–Range Bargain", by P. Piper, *Control*, p. 71, (Jun. 1996).

"The Merits of the Flame–Proof Tank Level Radar Gauge", *Marine Engineers Review*, 2 pgs. (Oct. 1994).

"Using Radar Level Measurement for Increased Environmental Protection and Plan Safety", by J. Daniewicz, *ISA, Paper #91–0470*, pp. 1201–1211, (1991).

"Accuracy and Simplicity Drive Level Gauging Technology", *Marine Engineers Review*, 3pgs., (Jan. 1996).

"Radar Level Technology Offers Accurate, Noncontact Measurements", by F. Fitch, *I&CS*, pp. 27–30, (Jan. 1996).

"Digital Signal Processing", by A. Oppenheim, 6 pgs., (Section 6.6), (1975).

"Calculation of Narrow–Band Spectra by Direct Decimatioin", by B. Liu et al., *IEEE Transactions on Acoustics, Speech, and Signal Processing*, vol. ASSP–26, No. 6, pp. 529–534, (Dec. 1978).

"Interpolation Algorithms for Discrete Fourier Transforms of Weighted Signals", by T. Grandke, *IEEE Transactions on Instrumentation and Measurement*, vol. IM–32, No. 2, pp. 350–355, (Jun. 1983).

"Installation and Operation Manual", *MeasureTech™RCM Continuous Measurement*, (May 1996).

"An Introduction to Radar", by M. Skolnik, *Chapter 1, Radar Handbook*, 11 pgs. (no date).

"Detection of Radar Signals in Noise", *Chapter 10, Introduction to Radar Systems*, pp. 369–397, (no date).

"Extraction of Information and Waveform Design" *Chapter 11, Introduction to Radar Systems*, pp. 399–340, (no date).

"CW and FM Radar", *Chapter 14, Radar Handbook*, pp. 14.1–14.45, (no date).

STATE TABLE

| STATE | | ACTION | NEXT STATE | | |
|---|---|---|---|---|---|
| LINE_TRACK_MODE | LINE_FOUND | ADAPTATION OF THE FREQUENCY DEPENDENT THRESHOLD | OPERATION ON THE COUNTER | | LINE_TRACK_MODE |
| TRUE | TRUE | YES | INF_COUNTER_TRACK=0 | | TRUE |
| TRUE | FALSE | NO | INF_COUNTER_TRACK+=1 | | FALSE IF (((INF_COUNTER_TRACK>=INF_MAX_TRACK) OR ((WINDOW_START_LINE ==RANGE_MIN) AND (WINDOW_STOP_LINE==RANGE_MAX))) |
| | | | | | TRUE ELSE |
| FALSE | TRUE | YES | IF_COUNTER_SEARCH+=1 | | TRUE IF(IF_COUNTER_SEARCH>=IF_MAX_SEARCH) |
| | | | | | FALSE ELSE |
| FALSE | FALSE | NO | IF_COUNTER_SEARCH=0 | | FALSE |

RADAR LEVEL GAUGE

BACKGROUND OF THE INVENTION

The present invention relates generally to microwave radar level gauges. More particularly, the present invention relates to radar level gauge circuitry and methods of operation used to accurately determine the level of a liquid or other material being monitored.

Radar level gauges are in wide use for making non-contact measurements of the level of products such as process fluids and other materials. These devices utilize antennas to transmit electromagnetic waves toward the material being monitored and to receive electromagnetic waves which are reflected at the surface of the material being monitored. Typically, a first or reference signal having a varying frequency is generated and the transmitted electromagnetic waves are produced as a function of the frequency of the reference signal. A second signal is then obtained from the electromagnetic waves reflected by the surface of the material and received by the antenna. The two signals should have substantially the same frequency, but different phases. A phase shift signal is then generated as a function of the phase differences between the reference signal and the second signal over the range of frequencies. The frequency of the phase shift signal is indicative of the distance travelled by the electromagnetic waves between the antenna and the surface of the material being monitored, and thereby of the level of the material. Radar gauges of the FMCW (frequency modulated continuous wave) type are well known as shown, for example in "Mikrowellen messen Fuellstaende" by Prof. Dr. Johanngeorg Otto in *Design & Elekronik-Sensortechnik* May 13, 1997, vol. 10/1997.

Conventionally, radar level gauges utilize complex and expensive circuitry to remove, from the phase shift signal, frequency components caused by reflection of the electromagnetic waves from surfaces other than the material being monitored. For example, the circuitry attempts to remove interference signals caused by reflections from the waveguide, from the sides of the tank, and from other surfaces which were not the intended target.

Typically, the interference components cannot be completely removed from the phase shift signal. Further, when monitoring the level of a liquid experiencing turbulent conditions, for example, caused by intentional agitation of a liquid, the phase shift signal will include a wide range of frequency components other than the frequency components corresponding to the level of the liquid which would have been detected in the absence of the turbulence. As a result of this and other phenomena associated with a spectrum analysis of the phase shift signal corresponding to a turbulent liquid or to foam covering the liquid, conventional radar level gauges have experienced difficulty in accurately determining the level of the liquid in the tank.

SUMMARY OF THE INVENTION

It is the object underlying the present invention to provide an improved method of operating a FMCW radar tank level gauge and a respective gauge that measure a level in a tank. This object is achieved by a method and apparatus according to the claims.

DETAILED DESCRIPTION OF THE PREFERRED EMBODIMENTS

Figure 1:
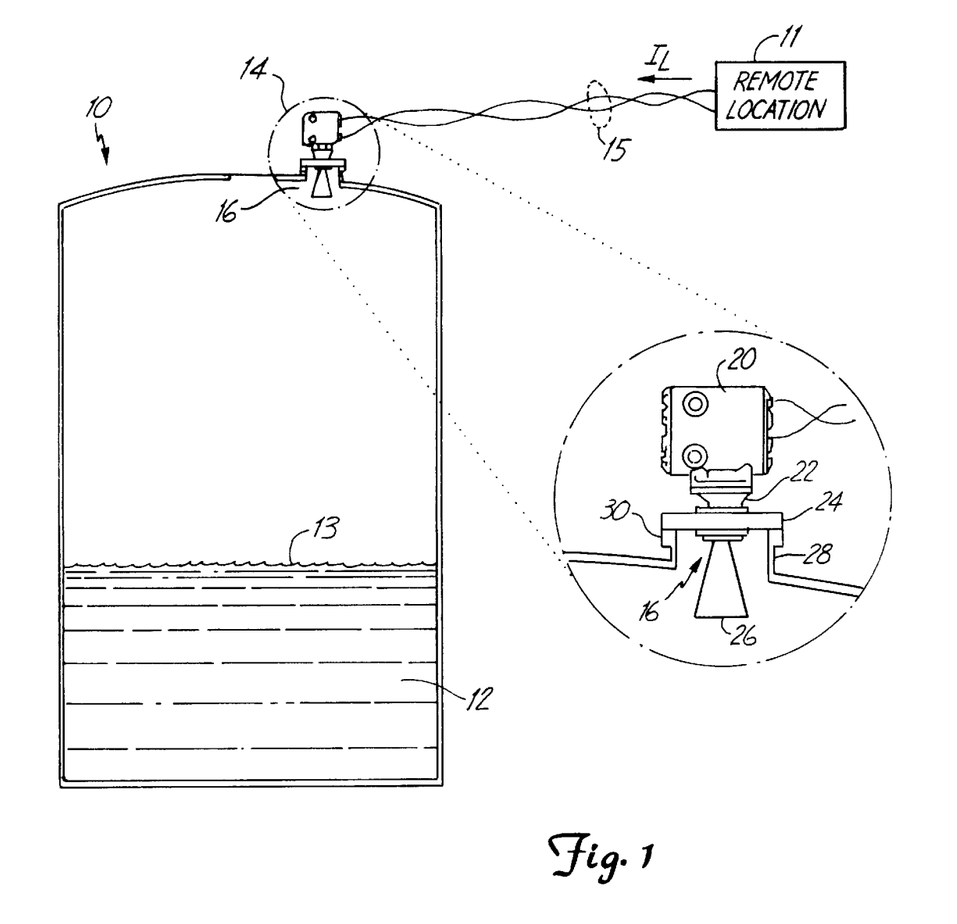
FIG. 1 is a schematic representation of a tank in which a radar level gauge according to the present invention is installed.

FIG. 1 is a schematic representation of process tank 10 in which microwave or radar level gauge 14 of the present invention is installed. Process tank 10 is filled with a liquid or other material 12, the height or level of which is to be determined by radar level gauge 14. Level gauge 14 is mounted on a tank port 16 at the top of the tank, and is sealed relative to the tank. Radar level gauge 14 transmits radar energy along a waveguide, through port 16 and receives reflected energy from the liquid surface 13 to provide an indication of the level of the liquid within the tank. Radar level gauge 14 is coupled to a remote location 11 (for example a control room) via two-wire process control loop 15 carrying loop current $I_L$.

The current $I_L$ in process control loop 15 can be representative of the level of the liquid or material in tank 10, or of a control signal From remote location 11. The current ranges between 4 and 20 mA, according to the ISA 4–20 mA standard. Gauge 14 can also be configured to communicate digitally over the 4–20 mA current, as in the HART® protocol, or can be fully digital communications as in Fieldbus.

Radar level gauge 14 includes an electronics housing 20, a housing to flange adapter 22, a process mounting flange 24 and an antenna 26. Radar level gauge 14 is mounted to a standoff pipe 28 which is fastened to the top of tank 10, around port 16. Tank flange 30 is fastened to standoff pipe 28. Process mounting flange 24 is secured with bolts to tank flange 30 and is sealed with a suitable gasket. Process mounting flange 24 supports both adapter 22 and electronics housing 20.

Figure 2:
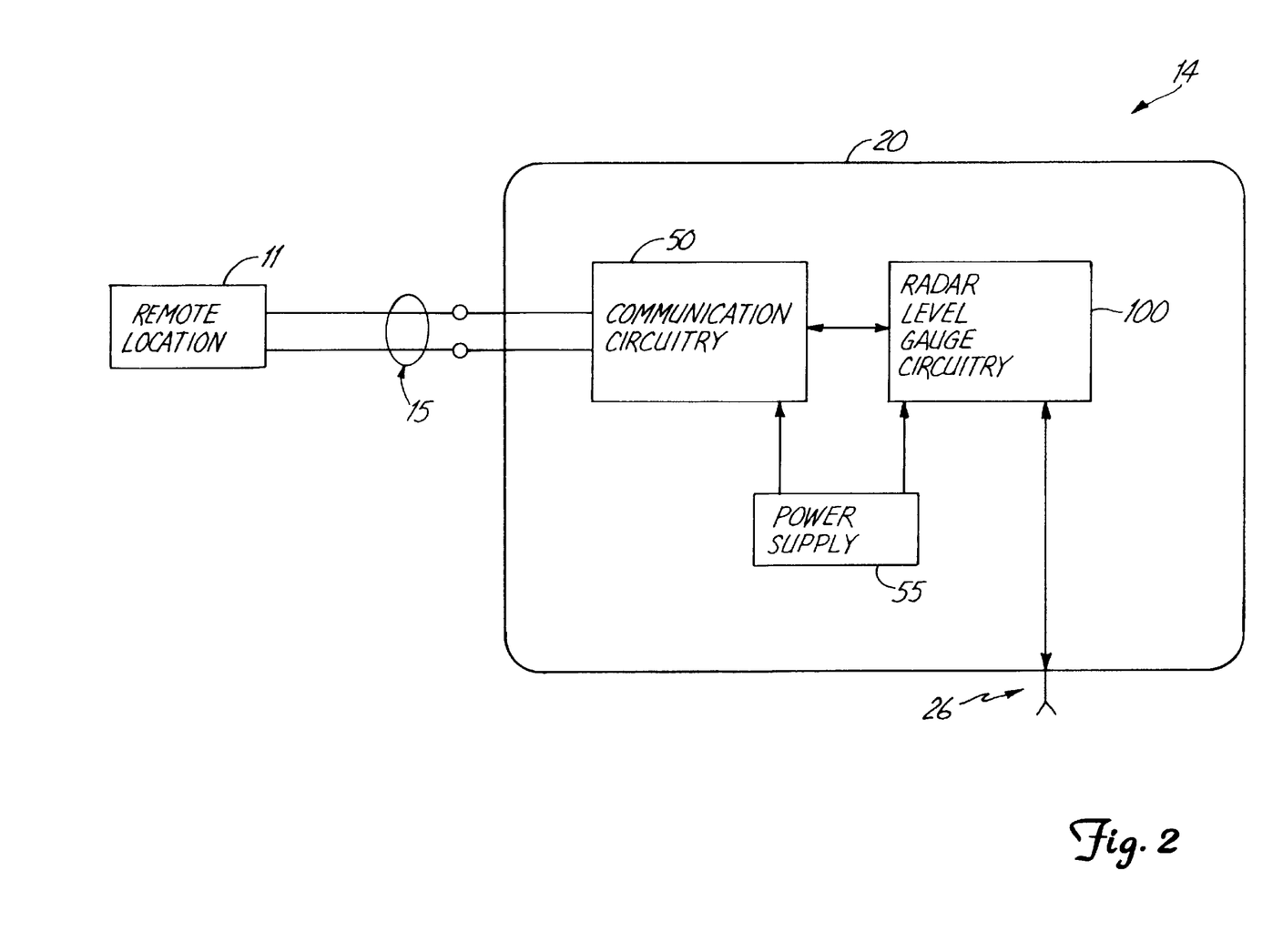
FIG. 2 is a block diagram illustrating the radar level gauge of the present invention.

FIG. 2 is a clock diagram illustrating circuitry of the radar level gauge in accordance with preferred embodiments of the present invention. The circuitry located within housing 20 of radar level gauge 14 includes communication circuitry 50, power supply circuitry 55 and radar level gauge circuitry 100. Communication circuitry 50 couples to two-wire process control loop 15 for communicating over loop 15. As such, communication circuitry 50 transmits information indicative of the level of material 12 in tank 10 over loop 15 by controlling the current on loop 15. In the alternative, as stated above, communication circuitry 50 communicates the level information on loop 15 digitally over the 4–20 milliamp current. Further, communication circuitry 50 can, in preferred embodiments, receive control signals from remote location 11 over loop 15. Communication circuitry 50 then provides these control signals to radar level gauge circuitry 100 for controlling operation of circuitry 100.

Radar level gauge circuitry 100 generates an electrical microwave signal, the reference signal. This signal is fed to antenna 26 for transmission into tank 10 by waveguides or other microwave transmission lines. Antenna 26 receives microwaves reflected off of surface 13 of material 12 in tank 10. An electrical signal corresponding to the reflected microwaves is provided to radar level circuitry 100. Radar level circuitry 100 then uses the reference signal and the reflected wave signal to determine the level of fluid 12 in tank 10. As will be discussed with reference to later figures in greater detail, radar level gauge circuitry 100 includes numerous features, some of which are embodied in hardware and others of which are embodied in software, which allow radar level gauge circuitry 100 to accurately determine the level of fluid 12 in tank 10, even under turbulent conditions.

Power supply 55 is coupled to each of communication circuitry 50 and radar level gauge circuitry 100 and provides a source of power, other than power from loop 15, for powering communication circuitry 50 and radar level gauge circuitry 100. However, in some embodiments, communication circuitry 50 includes its own power supply circuitry for generating power from the current in loop 15. In these embodiments, power supply circuitry 55 can be used to supply power only to radar level gauge circuitry 100 if desired.

Figure 3:
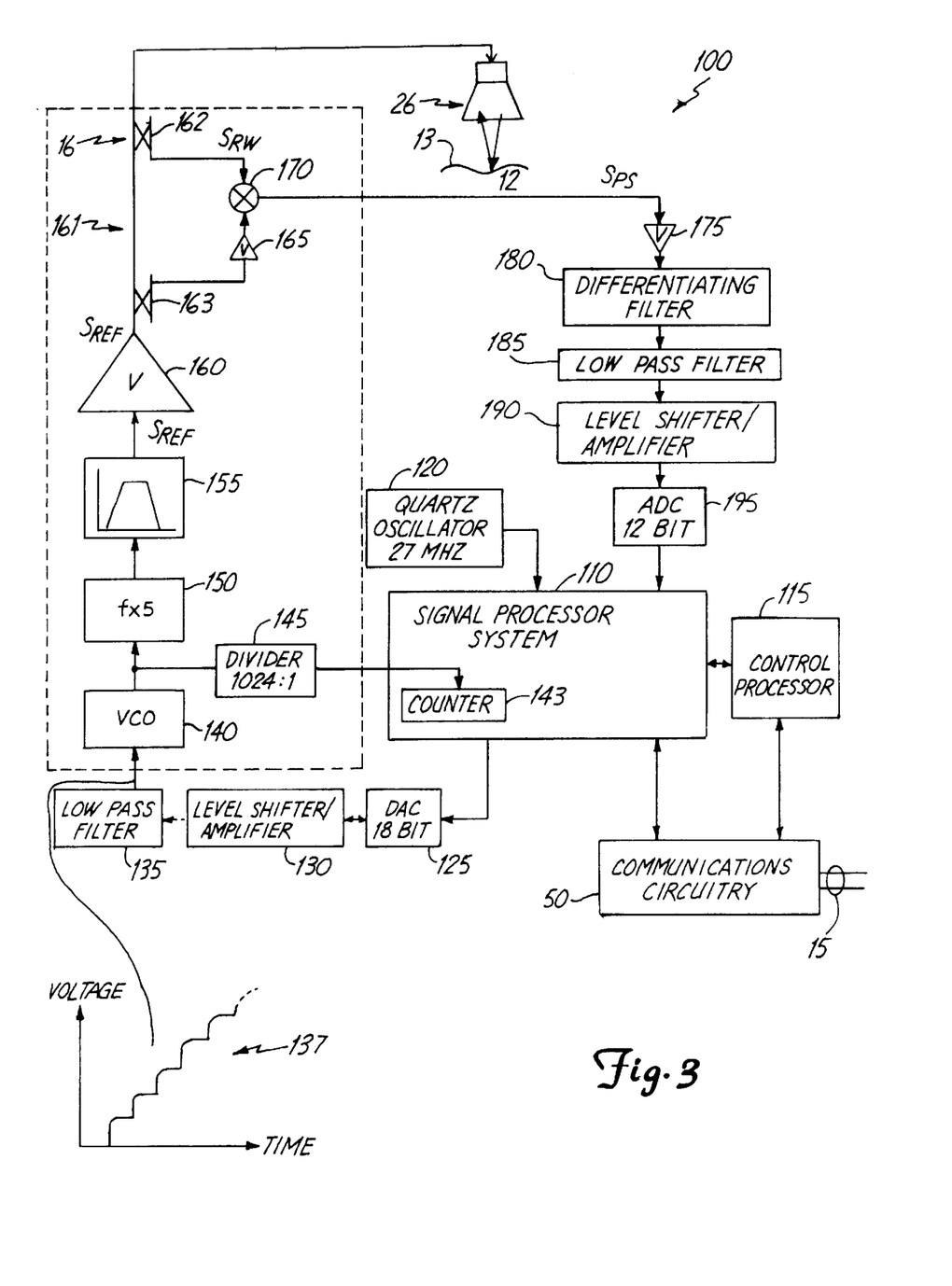
FIG. 3 is a block diagram illustrating in greater detail portions of the radar level gauge circuitry of the present invention.

FIG. 3 illustrates one embodiment of radar level gauge circuitry 100 in accordance with preferred embodiments of the present invention. As shown in FIG. 3, circuitry 100 includes signal processor 110, control processor 115, quartz oscillator 120, digital-to-analog-converter (DAC) 125, amplifier 130, low pass filter 135, voltage controlled oscillator (VCO) 140, divider 145, fifth harmonic generator 150, band pass filter 155, amplifier 160, amplifier 165, mixer 170, amplifier 175, differentiating gain filter 180, low pass filter 185, amplifier 190, and analog-to-digital converter (ADC) 195. In some preferred embodiments, signal processor 110 is a digital signal processor adapted for implementing the various algorithms and functions of the present invention. Control processor 115 is a processor adapted for controlling signal processor 110 and for communicating between signal processor 110 and communications circuitry 50. However, in other embodiments the functions of control processor 115 are performed by signal processor 110, and therefore control processor 115 can be eliminated. In these alternate embodiments, signal processor 110 communicates directly with communications circuitry 50, as is shown by the dashed line.

Quartz oscillator 120 preferably provides a 27 MHz reference clock signal for operation of signal processor 110. Signal processor 110 generates digital signals which vary repeatedly over a predetermined range of values. DAC 125 converts the digital signals into analog signals having corresponding amplitudes. The digital signals from system 110 are varied to provide a stepped voltage signal at the output of DAC 125. The stepped analog signals from DAC 125 are amplified by amplifier 130 and filtered by low pass filter 135 before he provided to VCO 140. Filter 135 limits the rate of change of the reference signal to limit the bandwidth of the signal $S_{REF}$.

In response to the ramp signal from filter 135, VCO 140 provides as an output a signal having a frequency which varies, preferably as linearly as possible, over a desired frequency range. The output of VCO 140 is provided both to fifth harmonic generator 150 and divider 145. Divider 145 converts the VCO frequency into a signal in the MHz frequency range. The loop provided by DAC 125, amplifier 130, low pass filter 135, VCO 140, divider 145 and a counter 143 within signal processor 110 is used as a feedback loop for linearization of the rate of change of the frequency of the VCO output. Fifth harmonic generator 150 generates frequency components at multiples of the basic frequency, and is designed to be such that the fifth harmonic of the VCO signal is particularly salient. Band pass filter 155 selects the fifth harmonic, and all other multiples of the VCO signal, as well as the fundamental wave, are suppressed. The level of the signal provided as an output by filter 155 is increased by amplifier 160.

The input to the VCO 140 has a linearly stepped voltage as shown at 137. In some preferred embodiments, the frequency of the reference signal varies between a range of about 24 GHz to about 26 GHz. Reference signal $S_{REF}$ is provided, via a waveguide 161, having directional couplers 162 and 163, to antenna 26. Antenna 26 transmits the corresponding microwaves toward surface 13 of material 12. Antenna 26 also receives microwave signals reflected off of surface 13. Amplifier 160 also provides reference signal $S_{REF}$ to amplifier 165. Amplifier 165 amplifies the reference signal $S_{REF}$ to a magnitude necessary to power mixer 170. Amplifier 165 also operates as microwave buffer to provide isolation.

The travel of the electromagnetic waves from antenna 26 to surface 13 and back results in a tank level dependent phase difference between reference signal $S_{REF}$ and reflected wave signal $S_{RW}$. Mixer 170 receives reference signal $S_{REF}$ and reflected wave signal $S_{RW}$, and provides as an output phase shift signal $S_{PS}$. Phase shift signal $S_{PS}$ is a low frequency signal having a frequency which is dependent upon the phase difference between signals $S_{REF}$ and $S_{RW}$, and which is thereby indicative of the distance travelled by the electromagnetic waves and thus of the level of material 12. In some preferred embodiments, the frequency of phase shift signal $S_{PS}$ ranges from about 330 Hz for a distance travelled from the antenna to the surface of material 13 of about 0.2 meters, to about 50 KHz for a distance travelled of about 30 meters.

Preferably, mixer 170 is of the type which produces a higher frequency output signal as the phase difference between input signals $S_{REF}$ and $S_{RW}$ increases. therefore, the further the distance travelled by the electromagnetic waves and thus the lower the level of material 13, the higher the frequency of phase shift signal $S_{PS}$. Since the amplitude of the electromagnetic waves decreases as the distance travelled increases, the amplitudes of signals $S_{RW}$ and $S_{PS}$ also tend to decrease as the level of material 13 decreases. Conventionally, this often required complex AGC (automatic gain control) circuitry to compensate for the decreased amplitude of higher frequency phase shift signals. Further, when monitoring the level of turbulent liquids, the AGC circuit complexity necessarily increases. In addition to increasing the cost of the level gauge, the complex AGC circuitry decreases the reliability of the electronics in conventional level gauges.

The amplifier 175 is coupled to the output of mixer 170. Amplifier 175 receives phase shift signal $S_{PS}$ and amplifies it to match the level for optimum use of the analog-to-digital converter 195.

The input of differentiating gain filter 180 is coupled to the output of amplifier 175 such that differentiating gain filter 180 receives phase shift. signal $S_{PS}$ from the amplifier 175. Differentiating gain filter 180 applies a frequency dependent gain to phase shift signal $S_{PS}$ and provides the amplified phase shift signal at the output of filter 180. In preferred embodiments, as the frequency of phase shift signal $S_{PS}$ increases, the gain applied to the phase shift signal increases as well. Thus, higher frequency phase shift signals, which have lower amplitudes as a result of the amplitude loss of the electromagnetic waves as they travel further to and from material 13, are amplified more than are lower frequency signals. Also, preferably the gain of differentiating gain filter 180 varies linearly as a function of the frequency of the phase shift signal over a desired frequency range, for example over the range from about 100 Hz to about 50 KHz.

Inclusion of differentiating gain filter 180 in accordance with preferred embodiments of the present invention eliminates the need for costly AGC circuit components. By applying a frequency dependent gain to the phase shift signal, the need for other AGC is eliminated or minimized. Further, differentiating gain filter 180 provides improved responsiveness as compared to many AGC circuit designs. This is very advantageous when monitoring the level of turbulent liquids Also, unlike AGC circuitry which may need to be calibrated for the particular material being monitored, differentiating gain filter 180 can be used with virtually any material without recalibration. Differentiating gain filter 180 is known in the electronics art, for example from Horowitz et al., The Art of Electronics, Second Edition, Section 4.20 (1989).

Phase shift signal $S_{PS}$ is next provided at the input to low pass filter 185. In preferred embodiments, low pass filter 185 has a cutoff frequency above the meaningful frequency range of phase shift signal $S_{PS}$, for example approximately 50 KHz, in order to filter out noise. The output of low pass filter 185 is coupled to amplifier 190 for amplification of signal $S_{PS}$. Finally, ADC 195 digitizes phase shift signal $S_{PS}$ and provides the digital signal (set of data points of mixed transmitted and received waves at each transmitted frequency) to signal processor 110 for storage. Signal processing 110 is preferably a microprocessor based circuit adapted to receive signal $S_{PS}$ and provide as an output to communications circuitry 50 a signal or information indicative of the level of material 13. The functions and algorithms implemented by signal processor 110, some of which can be embodied in hardware and some of which can be embodied in software, are discussed below in greater detail.

Figure 4:
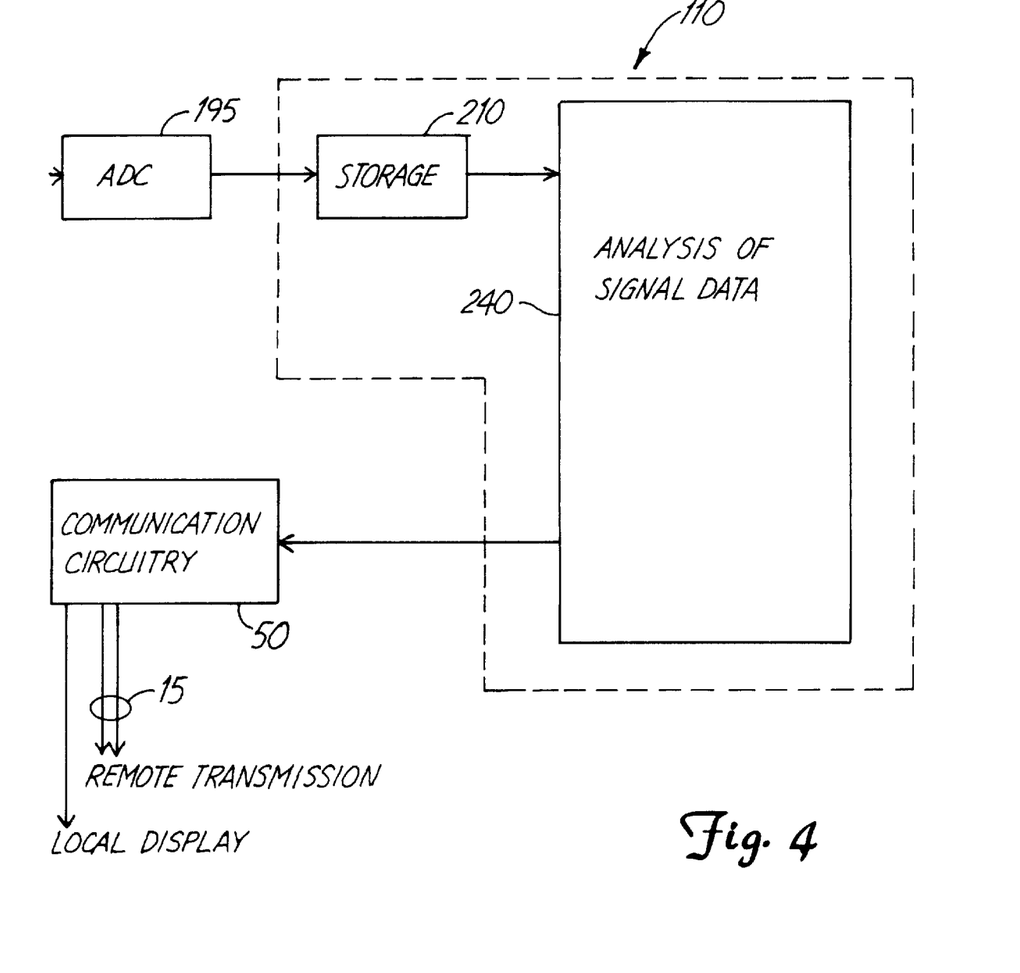
FIG. 4 is a block diagram illustrating various functions performed and algorithms implemented by the radar level gauge circuitry of the present invention.

FIG. 4 is a block diagram illustrating functional steps performed by signal processor 110 in preferred embodiments of the present invention. As illustrated in the functional blocks or steps of FIG. 4, signal processor 110 receives the digitized phase shift signal from ADC 195 and stores the digitized phase shift signals in random access memory (RAM) as indicated at step 210. Next, at step 240, the stored phase shift signal data is analyzed. The various steps and features of the analysis of the signal data illustrated in step 240 are described below in greater detail with reference to FIGS. 5–8D. After analysis of the signal data at step 240, signal processor 110 provides to communication circuitry 50 information indicative of the level of the material in tank 10. As described previously, communication circuitry 50 reports this level indicative information over two-wire loop 15, or to a local display.

Figure 5:
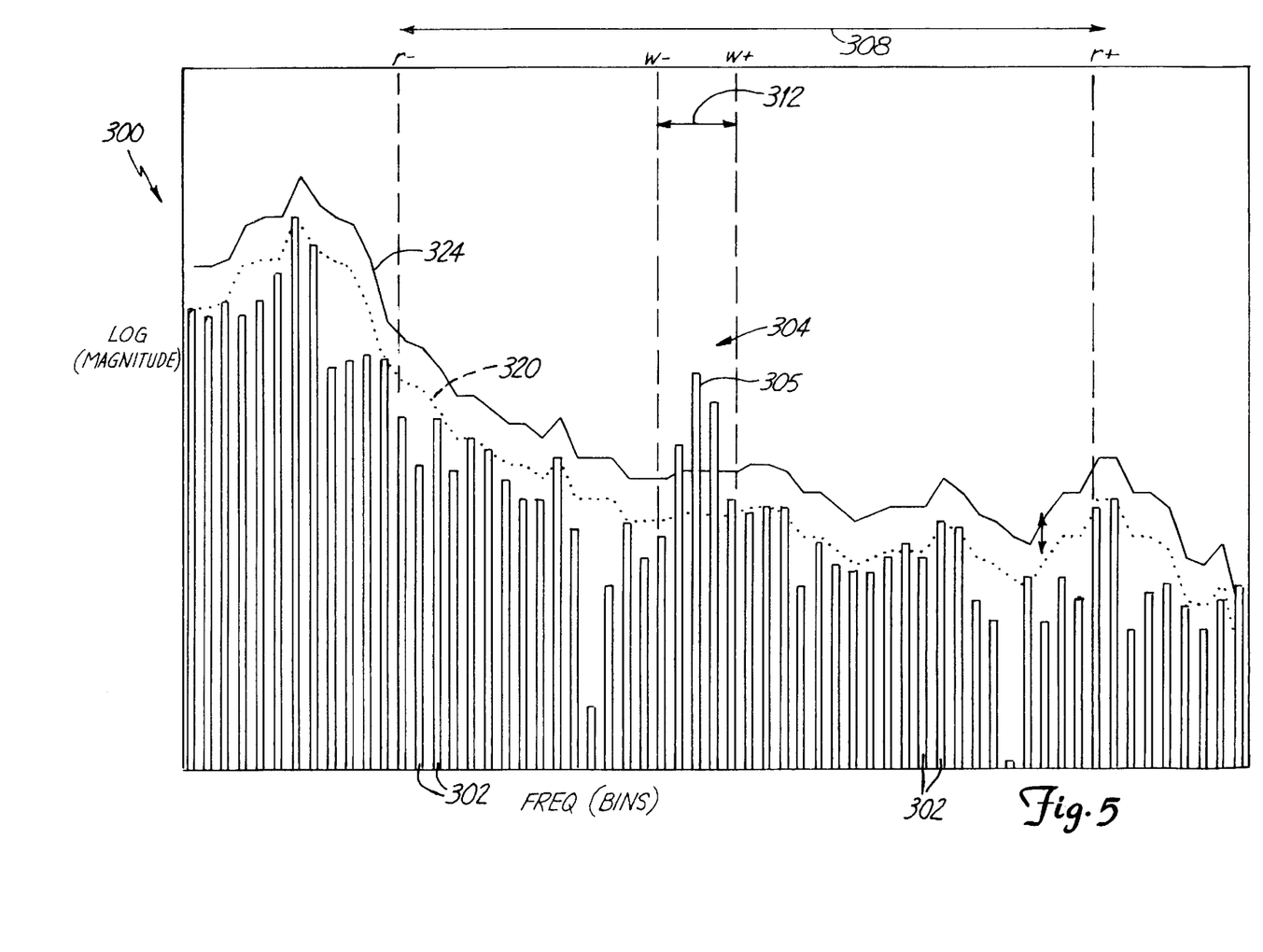
FIG. 5 is a graphical representation of a power spectral data set.

FIG. 5 illustrates pictorially one set of power spectral data 300 obtained from FFT (fast fourier transform) in step 240 in FIG. 4. Preferably, before FFT transformation, the time signal data stored at step 210 is Hamming weighted.

Generally, the power spectral data 300 comprises an integer number of frequency components 302, wherein the magnitude of each frequency component 302 is obtained and stored in suitable memory "bins". In a preferred embodiment, the number of bins equals 512, which corresponds to frequency components in the range from 0 Hz to approximately 50 KHz. Generally, the signal processor 110 processes the power spectral data in order to locate a target set of frequency components 304 that is indicative of the level of liquid surface 13 in the process tank 10. In view that the radar level gauge 14 is commonly mounted at the top of the process tank 10, the level of liquid surface 13 in the process tank 10 can be expressed as a function of the range of the liquid surface 13 from the antenna 26 of the radar level gauge 14 since the location of end of the antenna 26 from the bottom of the process tank 10 will be known.

Briefly, the power spectral data 300 is processed in order to locate a frequency component 305 with the largest magnitude (target marker) in a greater extent of the frequency spectrum of the power spectral data indicated by double arrow 308. Frequency components 302 adjacent the largest frequency component 305 define a lesser extent of the power spectral data or a "window" 312, which is used for further processing. The limits of the window 312 are indicated at w_ and w_+ in FIG. 5. Using the window 312 allows for efficient signal processing of subsequent sets of the power spectral data wherein the lesser extent of the frequency spectrum for each successive frequency spectrum is processed in order to calculate the level of liquid surface 13 in the process tank 10.

To locate the frequency component 305 having the largest magnitude in the power spectral data 300, an "interference buffer" 320 is calculated. Preferably, the interference buffer 320 is calculated continuously for each new set of power spectral data 300 obtained, if a maximum frequency component is found. The interference buffer 320 comprises a value for each frequency component 302 or bin. As explained below, the value calculated for each frequency component 302 can be a function of any one or, preferably, a combination of the following: the current magnitude of the frequency component 302, the maximum magnitude recorded for the frequency component 302, (if desired, within a selected time period), other previous values of the frequency component 302 within a selected time period, and a function of values of adjacent frequency components 302. A set of masking threshold values 324 is a type of interference buffer where the values have been increased by a fixed constant, for example 6 dB.

In a preferred embodiment, values for the interference buffer 320 outside of the search window 312 can be adaptively calculated as follows:

1) by adapting individual interference buffer values as a function of the associated spectral data value and at least one adjacent spectral data value. This can be expressed as:

$$\text{ave}[n](1/(2*\text{ave\_len}+1-n\_\text{exclude}))\Sigma_{i=n-ave\_len}^{n+ave\_len}\text{magn}[i]$$
for $i \notin \{\text{tpos-twin .. tpos+twin}\}$ and $$m[n]=\text{MAX}(\text{ave}[n],\text{magn}[n])$$

where

| n | bin number in the interference buffer |
|---|---|
| ave_len | is one-half of the width of the averaging window (bins) |

-continued

| | |
|---|---|
| n_exclude | = # ( {n–ave_len . . . n+ave_len}∩ {tpos–twin . . . tpos+twin}) |
| magn | values of power spectral data |
| tpos | bin number having the largest magnitude in the range r_ to r_+ |
| twin | is target window, width = 2*twin+1 (bins) | and/or, 2) by adapting individual interference buffer values as a function of the associated spectral data value and past interference values. This can be expressed as:

$$ib[n,t]=m[n,t]=m[n,t](1/M)+ib[n,t-1](M-1)/M$$

| | |
|---|---|
| ib | interference buffer |
| t | time |
| M | time constant |

Using the aforementioned criteria, the interference buffer 320 is a set of values which when compared with the current power spectral data provides less drastic changes in values than the current set of power spectral data. This is illustrated by the dashed line 320 in FIG. 5. It should be noted that values of the interference buffer 320 within the window 312 are not based on the current values of the frequency component 305 and adjacent frequency components 302 within the window 312, but rather, can be a simple linear interpolation between the values of the interference buffer 320 at the limits of the window 312 ($w_-$ and $w_+$).

Once the values of the interference buffer 320 have been determined, a set of masking threshold values indicated at 324 is calculated. In the embodiment illustrated, the set of masking threshold values is a simple scaler quantity, for example 6 dB above each value in the interference buffer 320. The set of masking threshold values 324 provides a filtering function so that slight changes in values of successive sets of power spectral data 300 do not get viewed as a possible target. In contrast, valid target sets, for example, target set 304 in the window 312 has values which exceed corresponding values of the set of masking threshold values so that these components of the power spectral data 300 can be properly processed in order to determine the level of the liquid surface 13 in the process tank 10.

Figure 6:
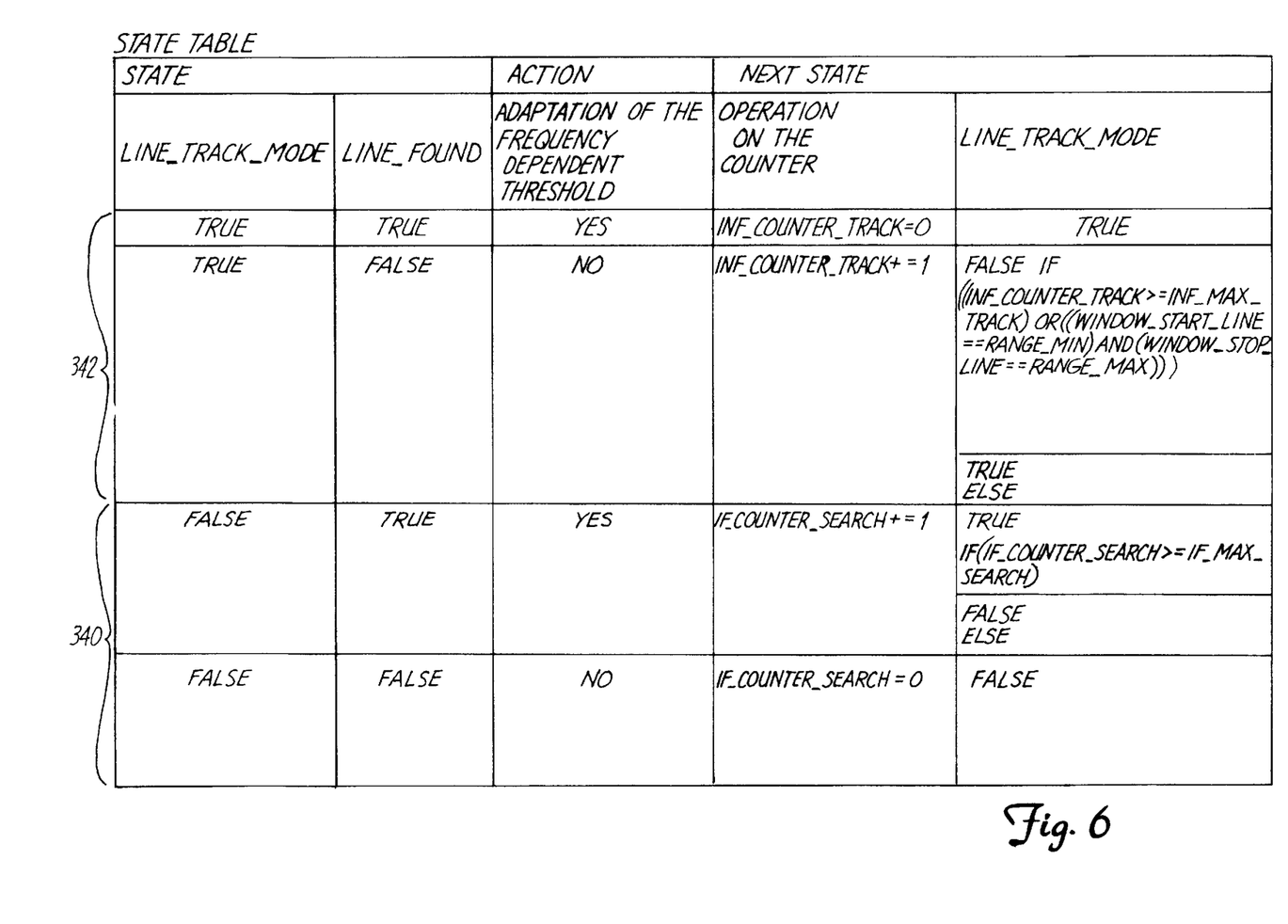
FIG. 6 is a state table of operation of a signal processor for analysis of power spectral data.
Figure 7:
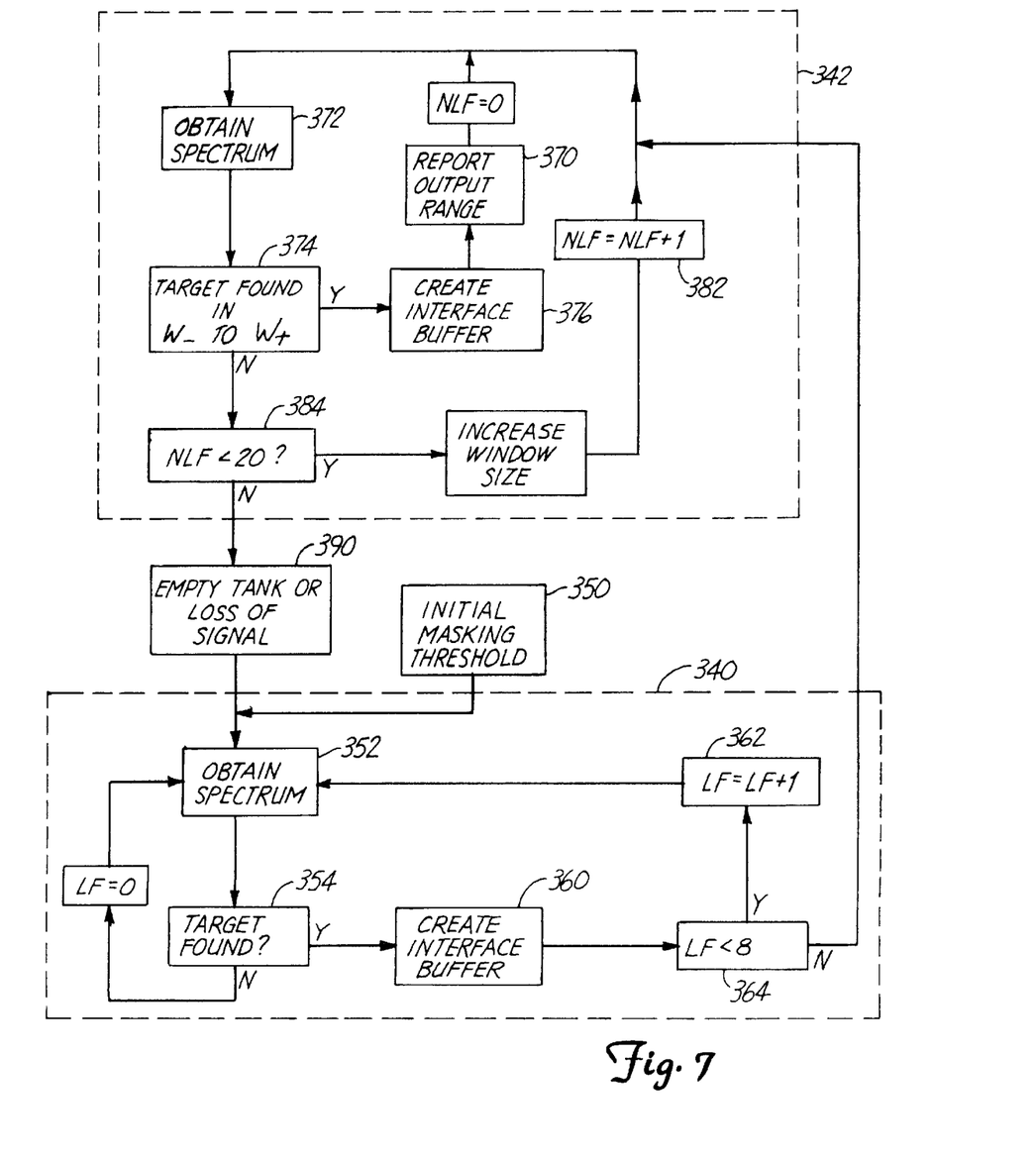
FIG. 7 is a flow chart of operation of a signal processor for analysis of power spectral data corresponding to the state table.

In one preferred embodiment, analysis of the power spectral data 300 is performed using two general modes of operation. Referring to FIGS. 6 and 7, a "search model" is indicated generally at 340. The search mode 340 includes process steps where the signal processor 110 analyzes the greater extent of the frequency spectrum 308 looking for a target set 304 above the set of masking threshold values 324. Upon location of a confirmed target set, the signal processor 110 enters a "track mode" generally indicated at 342. During the tracking mode, the signal processor 110 locks onto the target set and creates the window 312 for purposes of analysis in successive sets of the power spectral data 300. The signal processor 110 will remain in the track mode 342 until target sets are determined to be lost within the window 312. If no target sets are found in the window 312, the signal processor 110 will return to the search mode 340. Thus, if line_track_mode in FIG. 6 equals TRUE, this implies "track mode" whereas, if line_track mode equals FALSE, this implies "search mode".

Initially, the signal processor 110 enters the search mode 340 with an initial set of masking threshold values 324 as indicated at block 350. Preferably, the initial set of masking threshold values includes values, which are associated with static reflections from the antenna 26 or other fixtures associated with the top of the process tank 10. It is assumed that the level of liquid surface 13 in the process tank 10 will not exceed level $r_-$. In a preferred embodiment, $r_-$ is adjustable by the user.

It is assumed that the level of the liquid surface 13 of the process tank 10 will not be measured within the range to the right of $r_+$. The value $r_+$ is also preferably adjustable by the user and is used to filter out fixtures at the bottom of the process tank 10 such as agitators or the like, or when the bottom of the process tank 10 is curved. All values of the initial set of masking threshold values within the range $r_-$ to $r_+$ are set at a suitable value so that frequency components 302 within this range are indicative of possible targets.

After creation of the set of initial masking threshold values, program flow continues to block 352 where a set of power spectral data 300 or spectrum similar to FIG. 5 is obtained. As discussed above, the signal processor 110 then analyzes the power spectral data 300 in the range of $r_-$ to $r_+$ to locate the frequency component 305 with the largest magnitude that exceeds the corresponding value of the initial set of masking threshold values. If such a frequency component is not found as indicated at block 354, program flow returns to block 352 where another set of power spectral data 300 is obtained. If such a frequency component is not found within a predetermined number of successive iterations, the signal processor 110 will enter an alarm state where a suitable alarm signal is provided through the communication circuitry 50 to the remote location 11 (FIG. 1).

If a useable frequency component 305 is found as indicated at block 354, program flow proceeds to block 360 where the interference buffer 320 is updated. As stated above, the interference buffer 320 is used to create a new set of masking threshold values 324. A counter "LF" at block 362 is used to count the number of, preferably, successive occurrences of a suitable frequency component in successive sets of the power spectral data. When the counter LF has reached a predetermined value at block 364, for example eight (which can be adjustable in the field), program flow enters the track mode 342.

In a preferred embodiment, when a target set is found at block 354 a window 312 is subsequently created at block 360, the window 312 is then used successively until the counter LF exceeds the predetermined value. If a target set is not found in the window 312 before the counter LF has exceeded the predetermined value, the counter LF is reset and again the next search will be over the range $r_-$ to $r_+$.

Upon entry into track mode 342, the signal processor 110 uses Discrete Fourier Transformation (DFT) within the window 312 to obtain a range value indicative of the level of liquid surface 13 in the process tank 10. The calculated level of the liquid surface 13 in the process tank 10 is provided to the communication circuitry 50 in FIG. 3 to be transmitted to the remote location 11 (FIG. 1).

Preferably, program flow will remain in the track mode 342 indefinitely as long as a set of targets of sufficient magnitude is located in each successive set of power spectral data 300 or spectrum. After calculation of the output value using DFT at block 370, program flow continues to block 372 where another set of power spectral data 300 is obtained. Analysis is performed at block 374 on the power spectral data 300 within the window 312 ($w_-$ to $w_+$). If a target set is found within the window 312, program flow continues to block 376 where an interference buffer is created and a new set of masking threshold values are calculated similar to block 360 described above. Program flow then continues back to block 370 where DFT analysis is used to determine a new output value indicative of the level of the liquid surface 13 in the process tank 10. In a preferred embodiment, computation of the output value indicative of the level 13 includes a coarse computation followed by a fine computation to provide a more accurate value. The fine computation can be performed using DFT or Chirp z-Transformation.

If a target is not found in the window 312 for a set of power spectral data at block 374, program flow continues to block 382. A second counter "NLF" is used to count the number of occurrences which a target set was not found in successive sets of power spectral data at block 382. Block 384 determines if the counter NLF has exceeded a predetermined value, for example 20 (which can be adjustable in the field). Assuming at this point that the counter NLF has not exceeded this predetermined value, program flow preferably continues to block 382 where the counter NLF is incremented by one. Another set of power spectral data is then obtained at block 372. In a preferred embodiment as illustrated, before a new set of power spectral data is obtained at block 372, the window size increases in order to search a slightly larger extent of the frequency spectrum. In a preferred embodiment, the rate in which the window increases in size, is given by the following:

The size of the search window used depends on the value of nlf counter:

$$swin=(lf\_window\_minsize, roc\_bins*max(0,nlf\ counter-delay))$$

where

| | |
|---|---|
| lf_window_minsize | the minimum size of the window, if target found |
| roc_bins=roc/delta_r | (delta_r is the range_gate in meter (distance between two bins)). |
| roc | rage of change |
| delay | delay before the window is enlarged |

Thus the window increases over time with the rate given by the rate-of-change roc_bins when no target is found. If a target set is located in the window 312, the counter NLF can be reset.

If the counter NLF exceeds the predetermined value, program flow continues to block 390 where analysis is performed to determine whether the process tank 10 is empty or there has been a loss of signal.

FIGS. 8A–8D illustrate an example of the manner in which signal processor 110 of radar level gauge 14 functions in its two modes of operation, the search mode and the tracking mode, as described above with reference to FIGS. 6 and 7. The example illustrated in FIGS. 8A–8D corresponds to operation of radar level gauge 14 measuring level in a tank partially filled with peanut oil, and under several adverse conditions. To best illustrate the manner in which signal processor 110 functions in these two modes of operation, there are provided in FIGS. 8A–8D four plots which illustrate, respectively, signal-to-noise ratio (SNR) FIG. 8A, the value of the no line found (NLF) variable FIG. 8B, the actual range or distance from the top of the tank to surface 13 of material 12 as measured with an independent sensor FIG. 8C, and the mode (search or track) of operation, each plotted against the same time scale FIG. 8D. The time scale of each of FIGS. 8A–D are represented by numbers of data points, with each data point representing a time interval between six and seven seconds.

Figure 8A:
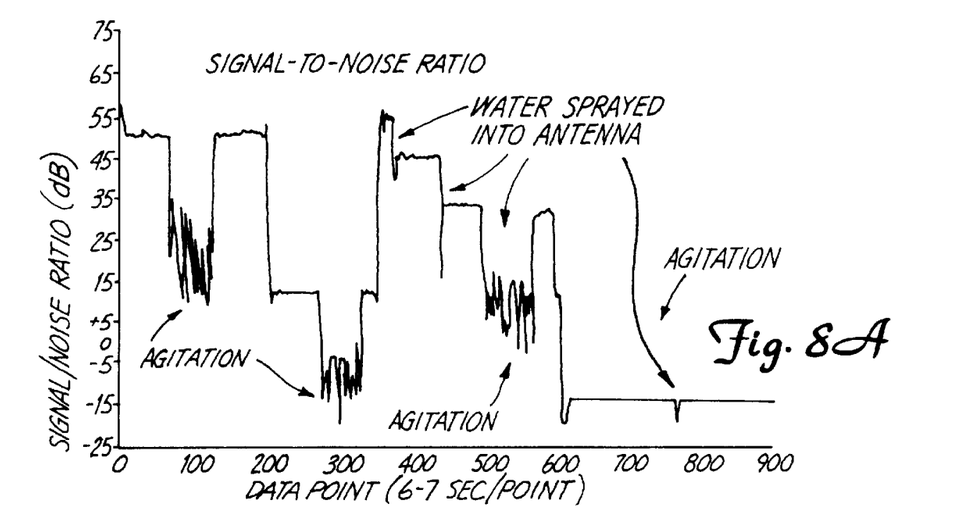
FIGS. 8A–8D are plots versus time of the signal-to-noise ratio (SNR), the NLF (no line found) value, the determined range and the mode of operation, respectively, during a series of interfering events.
Figure 8B:
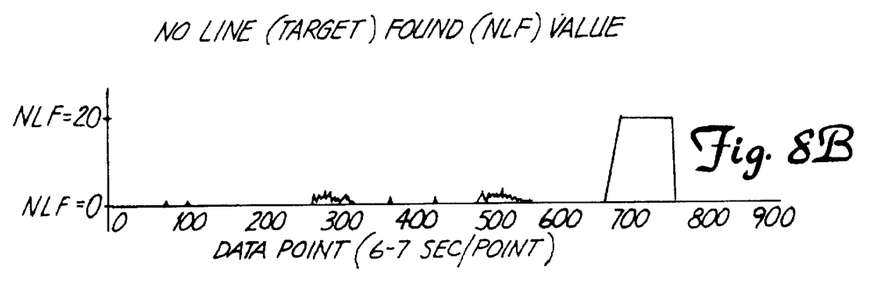
Figure 8C:
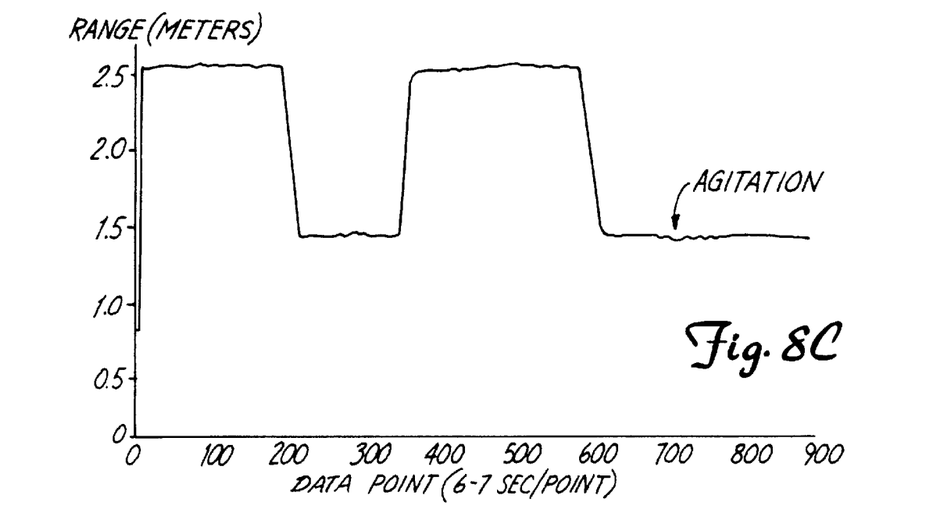
Figure 8D:
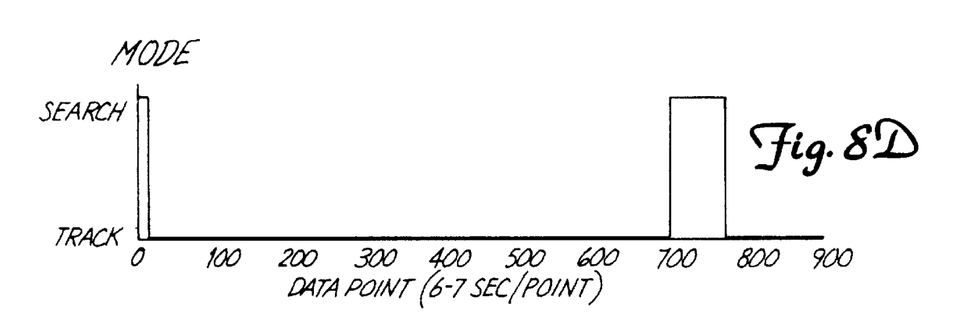

Shortly after the initial time period, the signal processor enters the tracking mode as illustrated in FIG. 8D. As illustrated in FIG. 8B, since NLF remains substantially equal to zero from data points zero through almost 300, the signal processor remains in the tracking mode. Further, since at no point prior to approximately data point 700 does NLF reach a value of 20, the signal processor remains in the tracking mode until approximately data point 700.

During this long time period in which the methods and apparatus of the present invention maintain the signal processor in the tracking mode, a variety of interfering events are cause to occur in order to demonstrate the adaptability of the present invention. At time periods corresponding to data points surrounding data point 100, liquid in tank 10 is agitated, as can be seen by the reduction in SNR at this point in FIG. 8A. However, utilizing the methods of the present invention of controlling the masking thresholds and the window size, the target is never lost for more than a couple of spectral analysis repetitions, as can be seen in FIG. 8B. Throughout this agitation, the signal processor provides a substantially constant range indication of approximately 2.5 meters to the surface of the liquid in the tank.

Beginning at the time period indicated by approximately data point 200, the level of the liquid in the tank is increased by about 1 meter such that the range decreases from 2.5 meters to about 1.5 meters. The change in the liquid level in the tank causes the SNR to decrease during this time period. With the increased liquid level causing a decreased SNR, the liquid in the tank was once again agitated at time period near data points 300. As can be seen in FIG. 8B, the combination of agitation with a reduced SNR caused by high liquid levels results in NLF taking on values greater than zero, thus representing a temporary loss of the target during one or more repetitions of the spectral analysis. However, since the methods of the present invention allowed the target to be quickly found, signal processor 110 does not leave the tracking mode as can be seen in FIG. 8D. Further, during this entire time period, the level of the liquid in tank 10 is accurately measured as is indicated in FIG. 8C.

Next, beginning at a time period corresponding approximately to data point 350, the level of the liquid in tank 10 is once again decreased by about one meter. During the time period corresponding to between about data point 350 and about data point 600, water was sprayed into antenna 26 to provide interference. At the same time, during the time period between about data point 500 and about data point 600, the liquid in the tank was also agitated. Both of these interfering events are illustrated in FIG. 8A. While spraying water into the antenna alone did not result in even a temporary loss of the target, the combination of spraying water into the antenna while agitating the liquid caused the target to be lost during tracking mode for a few repetitions, as illustrated in the NLF plot of FIG. 8B. However, during this entire time period, signal processor 110 remained in tracking mode as illustrated in FIG. 8D and accurately determined the level of the liquid in the tank as illustrated in FIG. 8C. At a time corresponding to about data point 600, the level of the liquid in tank 10 was once again increased.

Beginning at the time period corresponding to about data point 600, the level of the liquid in the tank was once again increased by about 1 meter, thereby again dropping the SNR due to the corresponding increase in near field noise, as can be seen in FIG. 8A. Between the time periods corresponding to about data point 700 and about data point 800, the peanut oil in the tank was agitated while water was simultaneously sprayed into antenna 26. As can be seen in FIGS. 8B AND 8D, the combination of a very high liquid level, a low dielectric material (peanut oil), agitation and spraying water into the antenna caused the target to be lost for more than 20 spectrum analysis cycles. Thus, signal processor 110 entered the search mode of operation and remained there until a target was found for eight consecutive spectrum analysis cycles.

We claim:

1. A method of operating a FMCW radar tank level gauge that measures a level in a tank by obtaining a set of phase shift data points of mixed transmitted waves and received waves, the method comprising:

generating and storing a set of spectral data phase shift values including a received target marker indicating the level;

calculating an adaptive set of masking threshold phase shift values corresponding to at least a portion of the spectral data phase shift values;

comparing the adaptive set of masking threshold phase shift values with the corresponding spectral data chase shift values to identify at least one spectral data phase shift value associated with the level;

calculating the level of the tank from said at least one spectral data phase shift value; and reporting the level of the tank.

2. The method of claim 1 wherein the step of calculating the adaptive set of masking threshold phase shift values includes adapting individual masking threshold phase shift values as a function of the associated spectral data phase shift value and at least one adjacent spectral data phase shift value.

3. The method of claim 1 wherein the step of calculating the adaptive set of masking threshold phase shift values includes adapting individual masking threshold phase shift values as a function of the associated spectral data phase shift value and past masking threshold phase shift values.

4. The method of claims 1, 2 or 3 further comprising:

defining a window of a first bandwidth around a received chase shift target marker as a function of the comparing;

searching for an absence of a later chase shift target marker in the window; and increasing the window to a second larger bandwidth if the phase shift target marker is absent from the window.

5. A FMCW radar tank level gauge that measures a level in a tank by obtaining a set of phase shift data points of mixed transmitted waves and received waves, the gauge comprising:

means for generating and storing a set of spectral data chase shift values including a received phase shift target marker indicating the level;

means for calculating an adaptive set of masking threshold phase shift values corresponding to at least a portion of the spectral data values;

means for comparing the adaptive set of masking threshold phase shift values with the corresponding spectral data phase shift values to identify at least one spectral phase shift data value associated with the level;

means for calculating the level of the tank from said at least one spectral phase shift data value; and means for reporting the level of the tank.

6. The method of claim 2 wherein the step of calculating the adaptive set of masking threshold phase shift values includes adapting individual masking threshold chase shift values as a function of the associated spectral data phase shift value and past masking threshold phase shift values.

* * * * *

UNITED STATES PATENT AND TRADEMARK OFFICE
CERTIFICATE OF CORRECTION

PATENT NO. : 6,107,957
DATED : August 22, 2000
INVENTOR(S) : Cramer et al.

It is certified that error appears in the above-identified patent and that said Letters Patent is hereby corrected as shown below:

```
Col. 11, line 19, replace "chase" with --phase--.
Col. 12, line 5,  replace "chase" with --phase--.
Col. 12, line 7,  replace "chase" with --phase--.
Col. 12, line 16, replace "chase" with --phase--.
Col. 12, line 30, replace "chase" with --phase--.
```

Signed and Sealed this

First Day of May, 2001

Attest:

NICHOLAS P. GODICI

*Attesting Officer*     *Acting Director of the United States Patent and Trademark Office*